Patented Nov. 13, 1928.

1,691,425

UNITED STATES PATENT OFFICE.

EUGENE E. AYRES, JR., OF SWARTHMORE, AND ERLING H. HAABESTAD, OF PHILADELPHIA, PENNSYLVANIA, ASSIGNORS TO B. A. S. COMPANY, OF PHILADELPHIA, PENNSYLVANIA, A CORPORATION OF DELAWARE.

ESTERS PRODUCED FROM ORGANIC HALIDES AND PROCESS OF PRODUCING THE SAME.

No Drawing. Application filed October 21, 1924, Serial No. 745,007. Renewed April 20, 1927.

Our invention relates to esters of organic acids produced from liquid esters of inorganic acids and to the process of producing such esters.

Although certain organic halides, such as the monochlorides of pentane, can be caused to react with sodium acetate to produce esters, such for example as amyl-acetate, there are so many practical difficulties in such an operation that the reaction cannot be conducted on a commercial scale. As the velocity of a reaction depends to a large extent upon the existence and maintenance of surface contact between the reacting substances, a chief difficulty encountered in an effort to react sodium acetate with organic halides lies in the fact that dry sodium acetate is insoluble in organic halides. The ideal condition for the reacting of one substance with another is the solution of one substance in another, and this ideal can be approached or simulated by securing colloidal contact between the substances.

It has not, heretofore, been found convenient to secure colloidal contact between salts of acetic acid such as anhydrous sodium acetate and liquid organic halides. And although aqueous solutions of acetates may be emulsified with organic halides by agitation, the emulsion quickly breaks down unless stabilized by the presence of some emulsion-stabilizing agent such as a protective colloid, and a suitable protective colloid has not been found. Furthermore, as the reaction is a reversible one the presence of water is objectionable. It has been suggested to secure molecular contact between sodium acetate and an organic halide with the intention of securing a reasonable velocity of reaction, by dissolving the sodium acetate in such solvents as acetic acid or ethyl-alcohol, but there are practical objections to the use of such solvents and such procedure has not been successfully practiced commercially.

It is an object of our invention to provide a process for producing esters from organic halides, mercaptans, and similar liquid esters of inorganic acids whereby the difficulties heretofore encountered will be avoided and whereby such esters may be produced rapidly in a simple manner and to a practically quantitative degree.

We have found that certain esters can be formed with great ease by securing colloidal degrees of contact between the reacting substances. The colloidal state in which reaction may be made to take place with a velocity comparable to the velocity of corresponding reactions in which the substances are completely dissolved in a common solvent, can be achieved when a gel comprising the organic derivative and the salt of the desired organic acid is produced. The reaction that takes place between substances that are in such colloidal state produces an ester and salt. The reaction, although it is a reversible one, has the advantage that it proceeds in the desired direction almost quantitatively notwithstanding the fact that considerable water is present, the water being eliminated from the gel as fast as the reaction proceeds. Further advantages are that the necessity for a solvent is avoided and that the gel in which the substances are in colloidal contact is formed without agitation and, as it persists during the reaction period, the necessity for agitation during the reaction is eliminated. As the reactions in which the esters are produced often occur while the reacting substances are heated and under pressure the elimination of the necessity for agitation is an important advantage although the temperature and pressure under which the reaction takes place are moderate as compared with temperatures and pressures heretofore sought to be used.

As the colloidal contact between the reacting substances causes the reaction to occur at a velocity that is comparable with the velocity of corresponding reactions in which the substances are completely dissolved, the reaction occurs at relatively low temperatures with the important advantage that the proportion of the liquid esters of an inorganic acid that is decomposed is much smaller than it would be otherwise and much smaller than the proportion decomposed in earlier processes. In the practice of our process the practical elimination of the production of olefins is an important advantage attained.

Having in hand the desired liquid esters of an inorganic acid in the form in which it is desired, the first step in the practice of our present invention is the colloidal contacting of such liquid esters of an inorganic acid and the salt of an organic acid with which it is desired to treat the liquid esters of an inorganic acid. To this end we produce a colloidal gel by warming the liquid esters of an inorganic acid with the salt of the organic acid. If the salts of organic acids that are employed are water-soluble the gels are made as more particularly described in our copending application Serial No. 745,006 filed October 21, 1924, namely, by heating together in the presence of water a water-soluble salt of a substantially water-insoluble fatty acid and a liquid ester of an inorganic acid at a temperature near the boiling point, at the pressure under which the heating takes place, of such ester, but for the production of esters the gel may be made from salts of organic acids that are not soluble in water, such for example, as aluminum stearate or oleate.

After a gel has been formed from the desired salt of an organic acid and a desired liquid esters of an inorganic acid the desired ester is produced by heating the gel to a temperature at which reaction will occur at the desired velocity and maintaining it at that temperature until the production of the ester is substantially complete. The temperature at which reaction will take place is readily determined by experiment and it should be a temperature below that at which any undesirable change will be made in the gel that is being treated or in the products resulting from the heating operation. Any pressure that may arise is occasioned by the relation between the boiling points of the substances and the temperature of reaction.

For the purpose of particularly illustrating the practice of our invention but without limiting our invention to the illustration described a specified example of the production of esters in accordance with our invention consists in warming 10 grams of ethylene dichloride in an open vessel with about 30 grams of sodium stearate at a temperature preferably below the boiling point of the organic halide for the purpose of producing a gel. The gel is then placed in an enclosed vessel and heated to a temperature that will give the desired velocity of reaction, e. g., about 150° C. After the gel has been maintained at such temperature for about an hour the contents of the vessel will consist of the ester of ethylene and stearic acid together with a small quantity of soap or a small quantity of halide which may have been present in molecular excess, and salt water. The reaction that probably takes place is as follows:

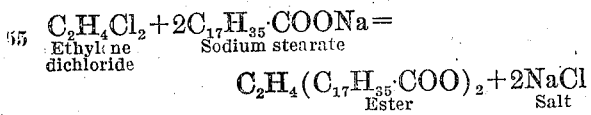

In the light of our invention, particularly as illustrated in the above example, it will be apparent that various other liquid esters of inorganic acid may be used and that various substances may be employed in place of sodium stearate. And we have found that any common soap, which contains some water, to which water has been added may be substituted for sodium stearate. But the esters formed will vary in properties with the proportions and with the types of the fatty acid radicals contained in the soaps employed. The conditions existing and the results produced by experiments in accordance with our invention indicate that any salt of an organic acid that has the property of forming a stable colloidal gel with a liquid ester of an inorganic acid can be employed in the practice of our invention. Ordinary water-soluble soaps can be used in the practice of our invention but it is not limited to such soaps and may be carried out with other water-soluble salts of organic acids such as, for example, the sodium or ammonium salts of sulphonated fatty acids or such salts of some sulphonic acids. It is not necessary for the practice of our invention that the salts of the organic acids employed shall be water-soluble as in the practice of our invention same water-insoluble salts of organic acids may be used such, for example, as aluminum oleate or stearate or the resinates of some of the heavy metals. Conspicuous examples of liquid esters of inorganic acids that may be used in the practice of our invention are liquid halides, mercaptans and nitrates of hydrocarbons, such esters of acids that do not contain oxygen being preferred. While various uses of esters formed in accordance with our invention are known or will be apparent to or ascertainable through experiment by persons skilled in the art, we have found that the readiness with which such esters can be saponified to yield corresponding alcohols, is a valuable characteristic and of great utility in the art.

While we have described our process in considerable detail we do not intend that our invention shall be limited to the specific substances and procedure described but that it shall be defined by the hereunto appended claims. And in this connection, as it has been pointed out that water is present in the practice of our invention, we would add that there is no definite limit upon the quantity of water introduced into the reacting chamber except that some water must be present, because any excess of water will be excluded from the gel in the formation of the gel. And in the same connection it is pointed out that where reference is made in the claims to salts of substantially water-insoluble fatty acids it is intended that such language shall include such salts that are both water-soluble and insoluble and include not only the salts of such acids but the salts of such derivatives of those acids as have the same colloidal characteristics, for example salts of the sulphonic derivatives of such acids. And it is pointed out that within the spirit of our invention a liquid ester of an inorganic acid is to be considered as any such ester that is liquid under the conditions of the reaction either by reason of its boiling point being above the temperature of the reaction or by reason of the pressure under which the reaction occurs.

The liquid esters of inorganic acids that are utilized in the production of organic esters in accordance with this invention, contain a radical or one or more atoms capable of being replaced by organic radicals and capable of combining with a metal to form a stable inorganic salt. Amyl chloride is an example of a liquid ester of an inorganic acid that may be utilized in the practice of this invention because its chlorine is replaceable by, for example, the acid radical of oleic acid and chlorine is capable of combining with, for example, sodium to form a stable salt, sodium chloride, both of these results being obtained by reacting amyl chloride with sodium oleate in the presence of water, the resulting ester being amyl oleate and the resulting salt being sodium chloride. Another example is ethyl nitrate in which the nitrate radical may be replaced by, for example, the acid radical of abietic acid and is also capable of combining with, for example, magnesium to form a stable salt, the treatment of ethyl nitrate with magnesium abietate producing ethyl abietate and magnesium nitrate. In the light of the general principles and specific examples herein set forth, the application of this invention to numerous specific substances will be apparent, and as another example magnesium benzene sulphonate reacted with ethyl nitrate produces ethyl benzene sulphonate and magnesium nitrate. If an organic derivative contains a halogen or sulphur that is so combined that it is incapable of replacement by organic acid radicals such derivatives are not liquid esters of inorganic acids.

What we claim and desire to secure by Letters Patent is:

1. The process of producing esters which comprises reacting a liquid ester of an inorganic acid in the presence of water with salts of a substantially water-insoluble fatty acid capable of forming a gel with said ester.

2. The process of producing esters which comprises reacting a liquid ester of an inorganic acid with common soap.

3. The process of producing esters which comprises reacting a liquid halogen substitution product of pentane with common soap.

4. The process of producing esters which comprises heating in a closed vessel in the presence of water a gel composed of a liquid ester of an inorganic acid and a salt of a substantially water-insoluble fatty acid capable of forming a gel with said ester.

5. The process of producing esters which comprises reacting in the presence of water a liquid ester of an inorganic acid with an organic salt capable of forming a stable colloidal gel with said liquid ester of an inorganic acid.

6. The process of producing esters which comprises maintaining at a temperature between 100° C. and 200° C. in the presence of water a gel composed of a liquid ester of an inorganic acid and a salt of a substantially water-insoluble fatty acid capable of forming a gel with said ester.

7. The process of producing esters which comprises reacting a liquid halogen derivative of a hydrocarbon in the presence of water with a salt of a substantially water-insoluble fatty acid capable of forming a gel with said derivative.

8. The process of producing esters which comprises heating together in the presence of water a liquid ester of an inorganic acid and a salt of a substantially water-insoluble fatty acid capable of forming a gel with said ester and thus producing a gel, and then heating the gel and thereby forming an ester.

9. The process of producing esters which comprises bringing into colloidal contact in the presence of water a liquid ester of an inorganic acid and a salt of a substantially water-insoluble fatty acid capable of forming a gel with said ester, and then heating the mass in a closed vessel.

10. The process of producing esters which comprises heating in a closed vessel with water a gel composed of a liquid halide derivative of a hydrocarbon and a salt of a substantially water-insoluble fatty acid capable of forming a gel with said derivative.

11. The process of producing esters which comprises heating together in the presence of water a liquid ester of an inorganic acid and an organic salt that are capable of producing a gel when heated together and thus producing a gel, and then heating the gel and thereby forming an ester.

12. The process of producing esters which comprises reacting in the presence of water a liquid halide derivative of a hydrocarbon with salts of organic acids capable of forming a stable colloidal gel with said halide derivative.

13. The process of producing esters which comprises heating a gel comprising a liquid halide derivative of a hydrocarbon and common soap.

14. The process of producing esters which comprises heating a gel comprising a chlorine substitution product of pentane and common soap.

15. The process of producing esters which comprises heating an alkali-metal salt of a substantially water-insoluble fatty acid with a liquid ester of an inorganic acid in the presence of water.

16. The process of producing esters which comprises heating a liquid ester of an inorganic acid in the presence of water with a salt of a fatty acid having more than twelve carbon atoms and capable of forming a gel in said ester.

17. The process of producing esters which comprises reacting a liquid halide derivative of a hydrocarbon in the presence of water with a salt of a fatty acid having more than twelve carbon atoms and capable of forming a gel with said derivative.

18. The process of producing esters which comprises heating together in the presence of water a liquid halogen derivative of a hydrocarbon and a salt of a fatty acid having more than twelve carbon atoms and capable of forming a gel with said derivative and thereby producing a colloidal gel, and heating the gel and thereby producing an organic ester and a salt of an inorganic acid.

19. The process of producing esters which comprises heating a liquid ester of an inorganic acid in the presence of water with a salt of an aliphatic acid having more than twelve carbon atoms and capable of forming a gel with said ester.

20. The process of producing esters which comprises reacting a liquid ester of an inorganic acid with an alkali-metal salt of oleic acid, in the presence of water.

21. The process of producing esters which comprises reacting a liquid halogen derivative of a hydrocarbon having four to six carbon atoms in the presence of water with a salt of a substantially water-insoluble fatty acid capable of forming a gel with said derivative.

22. The process of producing amyl oleate which comprises heating a liquid halogen substitution product of pentane in the presence of water with an alkaline-metal salt of oleic acid.

In testimony whereof, we have signed our names to this specification.

EUGENE E. AYRES, Jr.
ERLING H. HAABESTAD.